US012627664B2

(12) United States Patent
Lunt et al.

(10) Patent No.: US 12,627,664 B2
(45) Date of Patent: May 12, 2026

(54) OFFLINE DEVICE PROVISIONING

(71) Applicant: Microsoft Technology Licensing, LLC, Redmond, WA (US)

(72) Inventors: Morgan Westlee Lunt, Seattle, WA (US); Alexander I. Tolpin, Redmond, WA (US); Mengxi Chi, Bellevue, WA (US); Balendran Mugundan, Redmond, WA (US); Rajeev Mandayam Vokkarne, Sammamish, WA (US); Nikhil Vithlani, Bellevue, WA (US); Nicole Elaine Berdy, Kirkland, WA (US); Mahesh Sham Rohera, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 149 days.

(21) Appl. No.: 16/853,122

(22) Filed: Apr. 20, 2020

(65) Prior Publication Data

US 2021/0328865 A1     Oct. 21, 2021

(51) Int. Cl.
*G06F 15/173*        (2006.01)
*H04L 9/32*          (2006.01)
(Continued)

(52) U.S. Cl.
CPC ................ *H04L 63/10* (2013.01); *H04L 9/32* (2013.01); *H04L 12/66* (2013.01);
(Continued)

(58) Field of Classification Search
CPC ............... H04L 41/0806; H04L 63/107; H04L 63/0876; H04L 9/32; H04L 41/12;
(Continued)

(56) References Cited

U.S. PATENT DOCUMENTS 9,064,117 B1 *  6/2015  Worsley .................. G06F 9/441
9,590,857 B2    3/2017  Lee et al.
(Continued)

FOREIGN PATENT DOCUMENTS

CN        108293045  A      7/2018
CN        108605041  A      9/2018
EP          3128475  A1     2/2017

OTHER PUBLICATIONS

"International Search Report and Written Opinion Issued in PCT Application No. PCT/US21/020969", Mailed Date : Jun. 7, 2021, 13 Pages.
(Continued)

*Primary Examiner* — Vivek Srivastava
*Assistant Examiner* — Karina J Garcia-Ching
(74) *Attorney, Agent, or Firm* — Holzer Patel Drennan

(57) ABSTRACT

Provisioning an on-premise device within an on-premise communications network includes connecting, via a network connection, an on-premise gateway system in the on-premise communications network with an off-premise device provisioning service system in an off-premise communications network. The network connection is disconnected between the on-premise communications network and the off-premise communications network. A discovery request response is received from the on-premise device via the on-premise communications network, while the network connection is disconnected. A provisioning request from the on-premise device is received at the on-premise device provisioning service of the on-premise gateway system via the on-premise communications network, while the network connection is disconnected. An on-premise device provisioning service of the on-premise gateway system provisions the on-premise device based on provisioning records, while the network connection is disconnected.

22 Claims, 7 Drawing Sheets

(51) Int. Cl.
 H04L 9/40    (2022.01)
 H04L 12/66   (2006.01)
 H04L 41/0806  (2022.01)
(52) U.S. Cl.
 CPC ...... H04L 41/0806 (2013.01); H04L 63/0876
    (2013.01); H04L 63/107 (2013.01)
(58) Field of Classification Search
 CPC . H04L 12/66; H04L 12/2807; H04L 12/2834;
       H04L 63/10; H04L 63/08
 USPC ........................................................ 709/223
 See application file for complete search history.

(56) References Cited

U.S. PATENT DOCUMENTS

| | | | |
|---|---|---|---|
| 10,425,242 B2 | 9/2019 | Berdy et al. | |
| 10,481,922 B2 | 11/2019 | Pell et al. | |
| 2003/0070063 A1* | 4/2003 | Boyle | H04L 67/59 |
| | | | 713/2 |
| 2008/0082546 A1* | 4/2008 | Meijer | H04L 67/32 |
| 2012/0179802 A1* | 7/2012 | Narasimhan | H04L 67/1014 |
| | | | 709/223 |
| 2019/0179610 A1* | 6/2019 | Aiken | G10L 15/22 |
| 2019/0274050 A1 | 9/2019 | Roche et al. | |

OTHER PUBLICATIONS

"Cisco GPT Overview", Retrieved from: https://developer.cisco.com/docs/kinetic/#!provision-using-cisco-gpt/cisco-gpt-overview, Retrieved Date: Dec. 9, 2019, 17 Pages.
"Cisco Identity Services Engine Administrator Guide, Release 1.3", Retrieved from: https://web.archive.org/web/20160708081133/https:/www.cisco.com/c/en/us/td/docs/security/ise/1-3/admin_guide/b_ise_admin_guide_13/b_ise_admin_guide_sample_chapter_010000.html, Jul. 8, 2016, 17 Pages.
"Device Provisioning", Retrieved from: https://web.archive.org/web/20171205230438/http:/docs.aws.amazon.com/iot/latest/developerguide/iot-provision.html, Dec. 5, 2017, 1 Page.
"Provision Devices", Retrieved from: https://web.archive.org/web/20190831034507/https:/developers.google.com/android/work/play/emm-api/prov-devices, Aug. 31, 2019, 37 Pages.
"Sophos UTM: Offline Provisioning a RED Device", Retrieved from: https://community.sophos.com/kb/en-us/122099, Jun. 27, 2018, 2 Pages.
"Application as filed in U.S. Appl. No. 16/358,035", filed Mar. 19, 2019, 58 Pages.
Atin, "Selecting Right IoT Gateway for your IoT Application", Retrieved from: http://www.sensegrow.com/blog/selecting-right-iot-gateway-your-iot-application, Jun. 20, 2018, 10 Pages.
Gremban, et al., "How an IoT Edge Device Can be Used as a Gateway", Retrieved from: https://docs.microsoft.com/en-us/azure/iot-edge/iot-edge-as-gateway, Feb. 25, 2019, 4 Pages.
Lamos, et al., "Auto-Provisioning Concepts", Retrieved from: https://docs.microsoft.com/en-us/azure/iot-dps/concepts-auto-provisioning, Apr. 4, 2019, 8 Pages.
Scheltema, David, "Particle Mesh 101: Device Roles In Your Network", Retrieved from: https://blog.particle.io/2018/03/09/particle-mesh-101-device-roles-in-your-network/, Mar. 9, 2018, 7 Pages.
Communication pursuant to Article 94(3) EPC, Received in European Patent Application No. 21714567.1, mailed on Nov. 6, 2025, 07 pages.
Office Action Received for Chinese Application No. 202180029603.2, mailed on Aug. 29, 2024, 17 pages. (English translation Provided).
Rejection Decision Received for Chinese Application No. 202180029603.2, mailed on May 20, 2025, 14 pages. (English Translation Provided).
Second Office Action Received for Chinese Application No. 202180029603.2, mailed on Feb. 24, 2025, 16 pages. (English Translation Provided).

\* cited by examiner

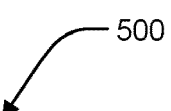

500

Connect, via a network connection, an on-premise gateway system in an on-premise communications network with an off-premise device provisioning service system in an off-premise communications network
502

Communicate one or more device provisioning records from the off-premise device provisioning service system to an on-premise device provisioning service of the on-premise gateway system via the network connection
504

Disconnect the network connection between the on-premise communications network and the off-premise communications network
506

Respond to a discovery request from an on-premise device via the on-premise communications network, while the off-premise communications network is disconnected
508

Receive, at the on-premise device provisioning service of the on-premise gateway system, a provisioning request from the on-premise device via the on-premise communications network, while the network connection is disconnected, responsive to the responding operation
510

Provision, by the on-premise device provisioning service of the on-premise gateway system, the on-premise device based on the one or more provisioning records, while the network connection is disconnected, responsive to receiving the provisioning request
512

FIG. 5

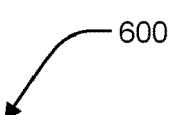

600

Disconnect the network connection between the on-premise communications network and the off-premise communications network
602

Respond to a discovery request from an on-premise device via the on-premise communications network, while the off-premise communications network is disconnected
604

Receive, at the on-premise device provisioning service of the on-premise gateway system, a provisioning request from the on-premise device via the on-premise communications network, while the network connection is disconnected, responsive to the responding operation
606

Provision, by the on-premise device provisioning service of the on-premise gateway system, the on-premise device based on the one or more provisioning records, while the network connection is disconnected, responsive to receiving the provisioning request
608

Connect, via a network connection, an on-premise gateway system in an on-premise communications network with an off-premise device provisioning service system in an off-premise communications network
610

Communicate one or more device provisioning records from the on-premise device provisioning service of the on-premise gateway system to the off-premise device provisioning service system via the network connection
612

FIG. 6

OFFLINE DEVICE PROVISIONING

BACKGROUND

A device provisioning service (DPS) can be used to authenticate and configure smart devices via an Internet network connection. Each smart device connects to a remote DPS via the Internet to request provisioning. When contacted by the smart device, the remote DPS challenges the smart device to prove its identity before securely configuring the smart device to work with other network-connected devices, service systems, and workloads (collectively, "solutions"). In this way, the smart device can securely communicate with solution systems in the cloud. For example, the smart device may be a smart sensor, plug, lightbulb, or another device (e.g., thermostat, doorbell, security camera) that is hardcoded to "wake-up" and begin registering itself with one or more cloud-based DPSs, such as Nokia Smart Home, Google Home®, Samsung SmartThings, Nest, Phillips Hue, Smart Life, Garmin Connect, etc. Each DPS then sets up the smart device to work securely with other network-connected solutions.

Unfortunately, without Internet connectivity to a DPS, smart devices are unable to receive secure provisioning. Therefore, at an on-premise location with an intermittent or nonexistent Internet connection (e.g., a remote drill site), installing and configuring a new smart device at that location is problematic. Accordingly, provisioning such devices without a reliable Internet connection presents unsolved challenges.

SUMMARY

The described technology provides a system and method of provisioning an on-premise device within an on-premise communications network. The method connects, via a network connection, an on-premise gateway system in the on-premise communications network with an off-premise device provisioning service system in an off-premise communications network. One or more device provisioning records are communicated between the off-premise device provisioning service system and an on-premise device provisioning service of the on-premise gateway system via the network connection. The network connection is disconnected between the on-premise communications network and the off-premise communications network. The method responds to a discovery request received from the on-premise device via the on-premise communications network, while the network connection is disconnected. A provisioning request from the on-premise device is received at the on-premise device provisioning service of the on-premise gateway system via the on-premise communications network, while the network connection is disconnected. An on-premise device provisioning service of the on-premise gateway system provisions the on-premise device based on the one or more provisioning records, while the network connection is disconnected.

This summary is provided to introduce a selection of concepts in a simplified form that is further described below in the Detailed Description. This summary is not intended to identify key features or essential features of the claimed subject matter, nor is it intended to be used to limit the scope of the claimed subject matter.

Other implementations are also described and recited herein.

BRIEF DESCRIPTIONS OF THE DRAWINGS

FIG. 5 illustrates example operations for offline provisioning with pre-provisioning enrollment.

FIG. 6 illustrates example operations for offline provisioning with post-provisioning enrollment.

DETAILED DESCRIPTIONS

In at least one implementation of the described technology, a networked-connected device, such as an Internet-of-Things (IoT) device, a network-connected industrial asset, a mobile computing device, or another communications device, can be securely provisioned within an on-premise network that is offline (not contemporaneously connected to the Internet). As such, even when an on-premise network is not connected to the Internet, such devices can be configured within the on-premise network to work securely with other on-premise devices and services available via the on-premise network. In addition, offline device provisioning can support configuring such devices to securely work with devices and services outside the on-premise network after the on-premise network connects to the Internet.

Figure 1:
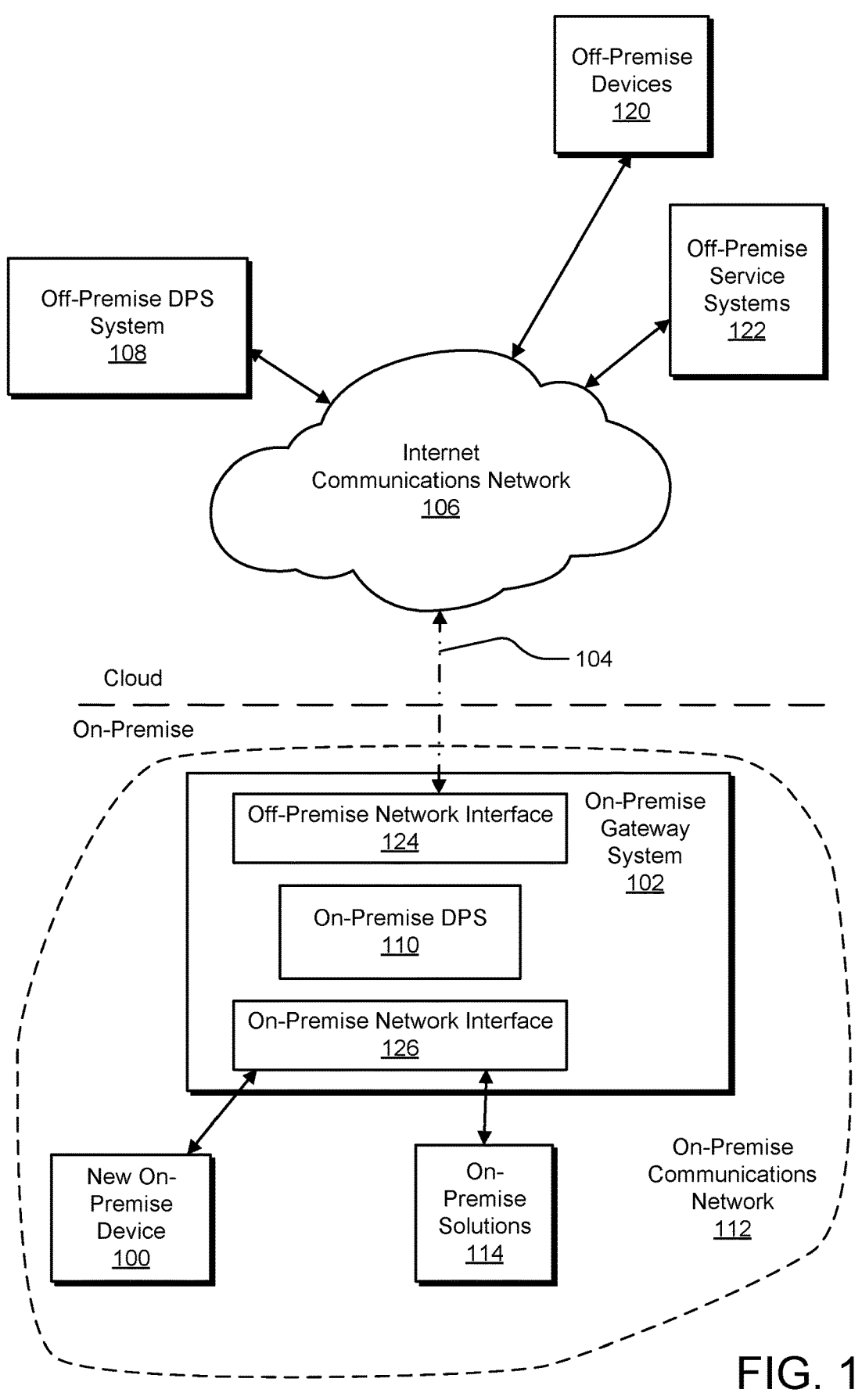
FIG. 1 illustrates example offline device provisioning of a new on-premise device.

FIG. 1 illustrates example offline device provisioning of a new on-premise device 100. In the illustrated example, assume that the on-premise location is a drill site with an unreliable Internet connection, although other on-premise locations are contemplated. As context, the drill site has control systems, sensors, monitoring services, and other on-premise solutions. The term "solutions" is defined herein as "network-connected devices, services, and/or workloads." From time to time, new on-premise devices are added at the on-premise location, and these devices require provisioning in order to work with the other on-premise solutions, even when an Internet connection is not available. These on-premise devices may also require provisioning for remote (e.g., cloud-based) solutions when an Internet connection is available or re-established.

For example, an on-premise pressure sensor may be added at the drill site and provisioned to work with an on-premise pressure monitoring service. Furthermore, the on-premise sensor may also require provisioning for remote (i.e., off-premise) solutions, such as software updating systems, calibration services, and maintenance logging solutions (see, e.g., off-premise devices 120 and off-premise services systems 122). Accordingly, if the on-premise pressure sensor can access an off-premise DPS system via an Internet connection, the off-premise DPS system can provision the new on-premise device, authenticating the new on-premise device and registering its cryptographic identity with various on-premise and off-premise solutions.

However, if the new on-premise pressure sensor cannot communicatively connect to the Internet communications network, the new on-premise pressure sensor cannot connect to the off-premise DPS system for provisioning. Nevertheless, until the Internet connection is re-established, the drill site operator may still wish that the on-premise pressure sensor is provisioned to work with the other on-premise solutions. Such provisioning is referred to as "offline device provisioning."

Referring to FIG. 1, the new on-premise device 100 is powered up (and/or connected other on-premise systems) and attempts to obtain provisioning. The new on-premise device 100 can connect to an on-premise gateway system 102 that has a potentially unreliable network connection (see, e.g., a network connection 104) to an Internet communications network 106 (referred to as a type of "off-premise communications network"). The on-premise gateway system 102 is a computing device or communications device that is part of an on-premise communications network 112. The on-premise gateway system 102 connects to the on-premise communications network 112 via an on-premise network interface 126, which includes hardware components. The on-premise gateway system 102 can connect the systems and solutions in the on-premise communications network 112 with the Internet communications network 106 via the network connection 104. The on-premise gateway system 102 connects to the Internet communications network 106 via an off-premise network interface 124, which includes hardware components.

If the new on-premise device 100 can connect through the on-premise gateway system 102 to an identified offline device provisioning service (see, e.g., the off-premise DPS system 108) via the Internet communications network 106, then the new on-premise device 100 sends a device provisioning request to an off-premise DPS system 108. In one example, the new on-premise device 100 sends the device provisioning request with a DPS identifier to a pre-defined URL. A service at the pre-defined URL re-directs the device provisioning request to the identified DPS, which interacts with the new on-premise device 100 to begin the provisioning process (e.g., authenticating the identity of the on-premise device 100, registering that identity with one or more on-premise and/or off-premise solutions, etc.). However, if the network connection 104 does not provide an active connection between the on-premise gateway system and the Internet communications network 106, then the off-premise DPS system 108 is unavailable, and the new on-premise device 100 seeks provisioning from an alternative provisioning source.

In FIG. 1, the alternative provisioning source is an on-premise DPS 110 of the on-premise gateway system 102, which is communicatively coupled with the new on-premise device 100 via an on-premise communications network 112. In one implementation, the on-premise DPS 110 is capable of provisioning on-premise devices, securely registering them to work with other on-premise solutions, such as one or more on-premise solutions 114.

To initiate such offline provisioning, the new on-premise device 100 initiates a discovery process on the on-premise communications network 112, such as by sending out a multicast DNS query for a given service type and domain. The discovery process enables the automatic discovery of devices and services on a local network using industry-standard IP protocols. For example, the discovery process allows the new on-premise device 100 to find all available instances of a particular type of service (represented as discovery endpoints) on the on-premise communications network 112 and to maintain a list of identified services and their corresponding port numbers. The new on-premise device 100 can then resolve the service hostnames to a list of IPv4 and IPv6 addresses. The list of named services provides a layer of indirection between a service and its current DNS name and port number. Indirection allows applications to keep a persistent list of available services and resolve an actual network address just prior to using a service. The list allows services to be relocated dynamically without generating a lot of network traffic announcing the change. If successful, the discovery process allows the new on-premise device 100 to identify and set up communications with a discovery endpoint in the on-premise gateway system 102, which is capable of providing the on-premise DPS 110. Thereafter, the new on-premise device 100 can request provisioning from the on-premise DPS 110 using standard device provisioning service protocols.

As part of the on-premise provisioning, the on-premise DPS 110 attempts to authenticate the new on-premise device 100 (typically challenging the new on-premise device 100 to prove its identity). Once the on-premise DPS 110 has authenticated the identity of new on-premise device 100, the on-premise DPS 110 registers the identity of new on-premise device 100 to communicate with the one or more on-premise solutions 114. Other provisioning operations may also be employed, including without limitation, setting and enforcing policies, setting SSIDs, storing local SSIDs and credentials, and other operational parameters. In this way, the new on-premise device 100 is provisioned to work/interact with one or more on-premise solutions 114.

Figure 2:
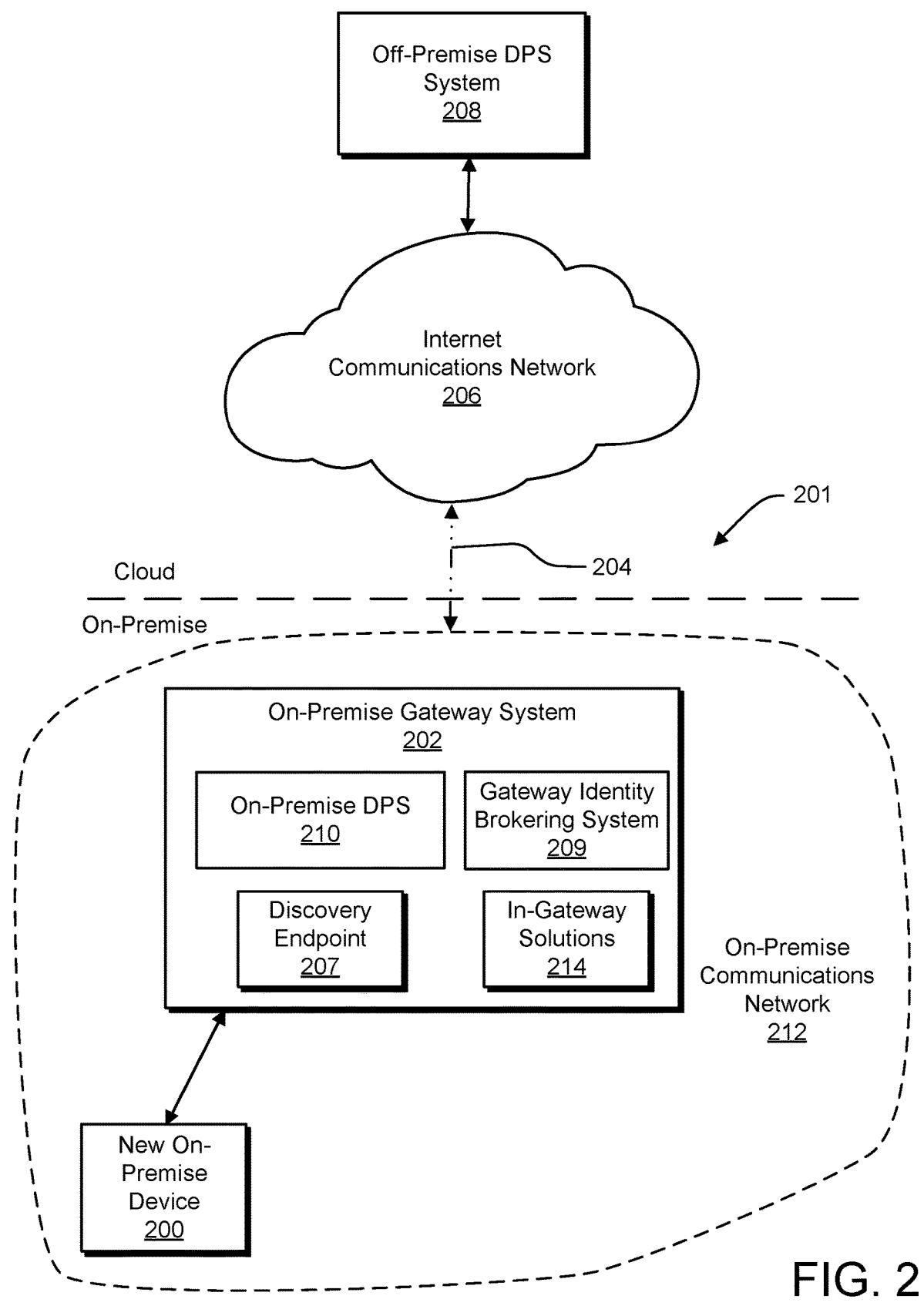
FIG. 2 illustrates an example offline device provisioning system for in-gateway solutions.

FIG. 2 illustrates an example offline device provisioning system 201 for in-gateway solutions 214. An in-gateway solution can include a device, a service, and/or a workload operating in an on-premise gateway system 202. The on-premise gateway system 202 is a computing device or communications device that is part of an on-premise communications network 212. The on-premise gateway system 202 can connect the systems and solutions in the on-premise communications network 212 with the Internet communications network 206 via the network connection 204.

A new on-premise device 200 is powered up (and/or electrically connected to other on-premise systems) and attempts to obtain provisioning. The new on-premise device 200 connects to an on-premise gateway system 202 and finds that the network connection 204 to an Internet communications network 206 (referred to as a type of "off-premise communications network") is unavailable. As such, provisioning by an off-premise DPS system 208 is unavailable at that time.

Accordingly, in order to obtain provisioning required to work with solutions (e.g., services) in the on-premise gateway system 202, the new on-premise device 200 initiates a discovery process within an on-premise communications network 212. In FIG. 2, the discovery process identifies a discovery endpoint 207 associated with an on-premise DPS 210. In one implementation, the on-premise DPS 210 is capable of provisioning on-premise devices, securely registering them to work with other on-premise solutions, such as one or more in-gateway solutions 214. If successful, the discovery process allows the new on-premise device 200 to identify and set up communications with the on-premise DPS 210 in the on-premise gateway system 202. Thereafter, the new on-premise device 200 can obtain provisioning from the on-premise DPS 210 using standard device provisioning service protocols.

As part of the on-premise provisioning, the on-premise DPS 210 attempts to authenticate the new on-premise device 200 (typically challenging the new on-premise device 200 to prove its identity). The on-premise DPS 210 relies on a gateway identity brokering system 209 to source and/or store cryptographic identities of the one or more in-gateway solutions 214. Such cryptographic identities are a type of device provisioning record that may be generated by or sourced from an in-gateway certificate authority or another identity issuer. Such identities may also be generated or sourced from off-premise systems and communicated to and stored on the gateway identity brokering system 209 when the Internet connection is active. Other device provisioning records, such as public keys, SSIDs, enrollment records, etc., may also be stored by the on-premise DPS 210 or the gateway identity brokering system 209.

Once the on-premise DPS 210 has authenticated the identity of the new on-premise device 200, the on-premise DPS 210 registers the identity of the new on-premise device 200 to communicate with the one or more in-gateway solutions 214. Other provisioning operations may also be employed, including without limitation, setting and enforcing policies, setting SSIDs, storing local SSIDs and credentials, and other operational parameters. In this way, the new on-premise device 200 is provisioned to work/interact with the one or more in-gateway solutions 214.

Figure 3:
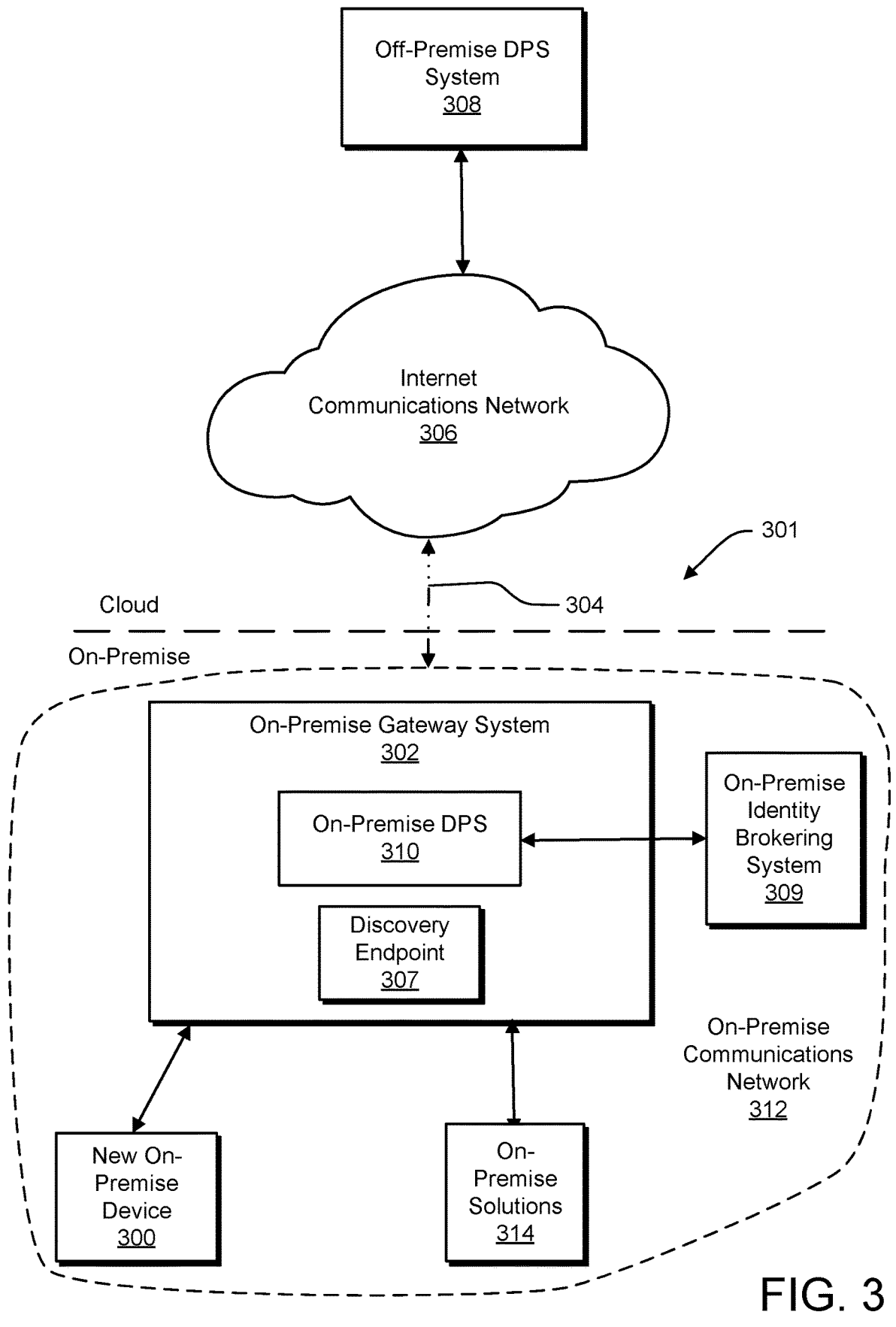
FIG. 3 illustrates an example offline device provisioning system for on-premise solutions.

FIG. 3 illustrates an example offline device provisioning system 301 for one or more on-premise solutions 314. An on-premise solution can include a device, a service, and/or a workload operating in an on-premise communications network 312. The on-premise gateway system 302 is a computing device or communications device that is part of the on-premise communications network 312. The on-premise gateway system 302 can connect the one or more on-premise solutions 314 in the on-premise communications network 312 with the Internet communications network 306 via the network connection 304.

A new on-premise device 300 is powered up (and/or electrically connected to other on-premise systems) and attempts to obtain provisioning. The new on-premise device 300 connects to an on-premise gateway system 302 and finds that the network connection 304 to an Internet communications network 306 (referred to as a type of "off-premise communications network") is unavailable. As such, provisioning by an off-premise DPS system 308 is unavailable at that time.

Accordingly, in order to obtain provisioning required to work with the one or more on-premise solutions 314 in the on-premise communications network 312, the new on-premise device 300 initiates a discovery process within an on-premise communications network 312. In FIG. 3, the discovery process identifies a discovery endpoint 307 associated with an on-premise DPS 310. In one implementation, the on-premise DPS 310 is capable of provisioning on-premise devices, securely registering them to work with other on-premise solutions, such as one or more on-premise solutions 314. If successful, the discovery process allows the new on-premise device 300 to identify and set up communications with the on-premise DPS 310 in the on-premise gateway system 302. Thereafter, the new on-premise device 300 can obtain provisioning from the on-premise DPS 310 using standard device provisioning service protocols.

As part of the on-premise provisioning, the on-premise DPS 310 attempts to authenticate the new on-premise device 300 (typically challenging the new on-premise device 300 to prove its identity). The on-premise DPS 310 relies on an on-premise identity brokering system 309 to provide and/or store cryptographic identities of the one or more on-premise solutions 314. Such cryptographic identities are a type of device provisioning record that may be generated by an in-gateway certificate authority or another identity issuer. Such identities may also be generated off-premise and communicated to and stored on the on-premise identity brokering system 309 when the Internet connection is active. Other device provisioning records, such as public keys, SSIDs, enrollment records, etc., may also be stored by the on-premise DPS 310 or the on-premise identity brokering system 309.

Once the on-premise DPS 310 has authenticated the identity of the new on-premise device 300, the on-premise DPS 310 registers the identity of the new on-premise device 300 to communicate with the one or more on-premise solutions 314. Other provisioning operations may also be employed, including without limitation, setting and enforcing policies, setting SSIDs, storing local SSIDs and credentials, and other operational parameters. In this way, the new on-premise device 300 is provisioned to work/interact with the one or more on-premise solutions 314.

Figure 4:
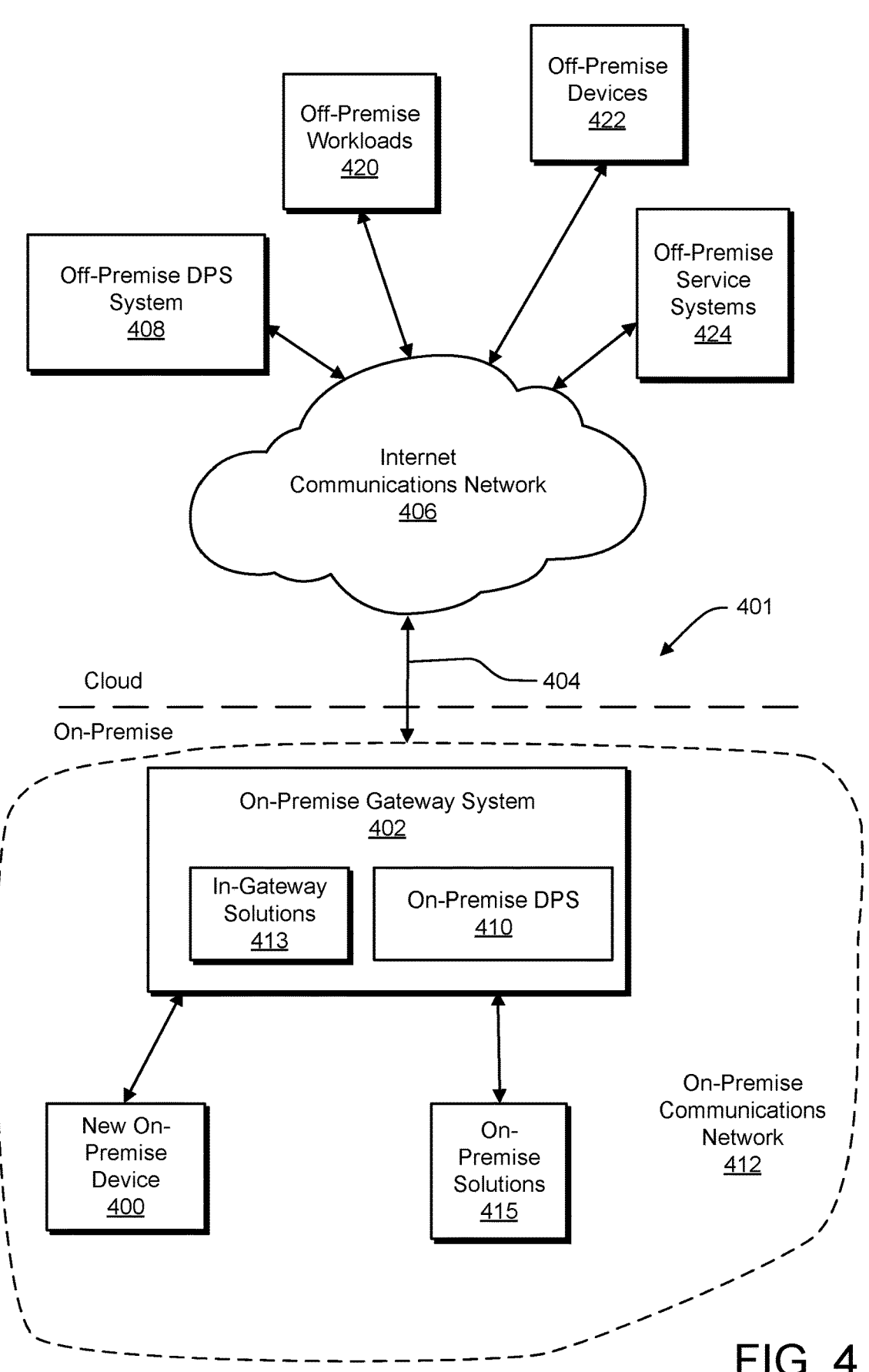
FIG. 4 illustrates an example offline device provisioning system with pre-provisioning enrollment.

FIG. 4 illustrates an example offline device provisioning system 401 that supports with pre-provisioning enrollment and/or post-provisioning enrollment. In the case of pre-provisioning enrollment, prior to the provisioning of a new on-premise device 400, the on-premise gateway system 402 receives device provisioning records for one or more in-gateway solutions 413, one or more on-premise solutions 415, and/or the new on-premise device 400. For example, the new on-premise device 400 is purchased off-premise and registered with an off-premise DPS system 408. At some time, when the network connection 404 is active, the device provisioning records for the new on-premise device 400 (and other solutions) can be received from the off-premise DPS system 408 in anticipation of a provisioning request from the new on-premise device 400.

When the new on-premise device 400 is transported to the on-premise location and finds that the network connection 404 is not active, the on-premise DPS 410 is already configured with relevant device provisioning records to provision the new on-premise device 400 to work with other solutions, such as the one or more in-gateway solutions 413 and/or the one or more on-premise solutions 415.

In the case of post-provisioning enrollment, device provisioning records generated by the on-premise DPS 410 are communicated to the off-premise DPS system 408 when the network connection 404 is re-established. After the provisioning of a new on-premise device 400, the on-premise gateway system 402 can transmit device provisioning records for one or more in-gateway solutions 413, one or more on-premise solutions 415, and/or the new on-premise device 400 through the network connection 404 to the off-premise DPS system 408. For example, the new on-premise device 400 is purchased off-premise and transported to the on-premise location. When the new on-premise device 400 attempts to obtaining provisioning and finds that the network connection 404 is not active, the on-premise DPS 410 generates and/or applies its own on-premise device provisioning records (e.g., using an in-gateway identity brokering system or an on-premise identity brokering system) to provision the new on-premise device 400 to communicate with the one or more in-gateway solutions 413 and/or the one or more on-premise solutions 415. Thereafter, when the network connection 404 is re-established, the on-premise device provisioning records generated and/or applied by the on-premise DPS 410 registered with an off-premise DPS system 408. Furthermore, the off-premise DPS system 408 can also, at that time, provision the new on-premise device 400 for access to off-premise solutions, such as off-premise workloads 420, off-premise devices 422, and/or off-premise service systems 424.

In addition, as part of post-provisioning enrollment, the off-premise DPS system 408 can provide feedback to the on-premise DPS 410 or to the new on-premise device 400, changing its provisioning of the new on-premise device 400. For example, the off-premise DPS system 408 instruct the on-premise DPS 410 to de-provision the new on-premise device 400 for a particular on-premise solution, thereby terminating the ability for the new on-premise device 400 and the particular on-premise solution to interact. In another example, the off-premise DPS system 408 can supersede or overwrite the provisioning provided by the on-premise DPS 410, provisioning the new on-premise device 400 for its own purposes. In this fashion, the off-premise DPS system 408 can have a parent-child hierarchical relationship with the on-premise DPS 410, such that the off-premise DPS system 408 has priority over the on-premise DPS 410.

FIG. 5 illustrates example operations 500 for offline provisioning with pre-provisioning enrollment. A connecting operation 502 connects a network connection between an on-premise gateway system in an on-premise communications network and an off-premise device provisioning service system in an off-premise communications network. A communication operation 504 communicates one or more device provisioning records from the off-premise device provisioning service system to an on-premise device provisioning service of the on-premise gateway system via the network connection. Example provisioning records may include without limitation certificates, public keys, credentials, and other provisioning parameters. A disconnecting operation 506 disconnects the network connection between the on-premise communications network and the off-premise communications network.

A responding operation 508 responds to a discovery request from an on-premise device via the on-premise communications network, while the network connection is disconnected between the on-premise gateway system in the on-premise communications network and the off-premise device provisioning service system in the off-premise communications network. Responsive to the responding operation 508, a receiving operation 510 receives, at the on-premise device provisioning service of the on-premise gateway system, a provisioning request from the on-premise device via the on-premise communications network, while the network connection is disconnected. Responsive to the receiving operation, in a provisioning operation 512, the on-premise device provisioning service of the on-premise gateway system provisions the on-premise device based on the one or more provisioning records, while the network connection is disconnected.

FIG. 6 illustrates example operations 600 for offline provisioning with post-provisioning enrollment. A disconnecting operation 602 disconnects a network connection between an on-premise communications network and an off-premise communications network. The on-premise communications network includes an on-premise gateway system, including an on-premise device provisioning service. The off-premise communications network includes an off-premise device provisioning system.

A responding operation 604 responds to a discovery request from an on-premise device via the on-premise communications network, while the network connection is disconnected between the on-premise gateway system in the on-premise communications network and the off-premise device provisioning service system in the off-premise communications network. Responsive to the responding operation 604, a receiving operation 606 receives, at the on-premise device provisioning service of the on-premise gateway system, a provisioning request from the on-premise device via the on-premise communications network, while the network connection is disconnected. Responsive to the receiving operation 606, in a provisioning operation 608, the on-premise device provisioning service of the on-premise gateway system provisions the on-premise device based on the one or more provisioning records, while the network connection is disconnected. Example provisioning records may include without limitation certificates, public keys, credentials, and other provisioning parameters.

A connecting operation 610 connects the network connection between an on-premise gateway system in an on-premise communications network and an off-premise device provisioning service system in an off-premise communications network, after the provisioning operation 608. A communication operation 612 communicates the one or more device provisioning records from the on-premise device provisioning service of the on-premise gateway system to the off-premise device provisioning service via the network connection.

Figure 7:
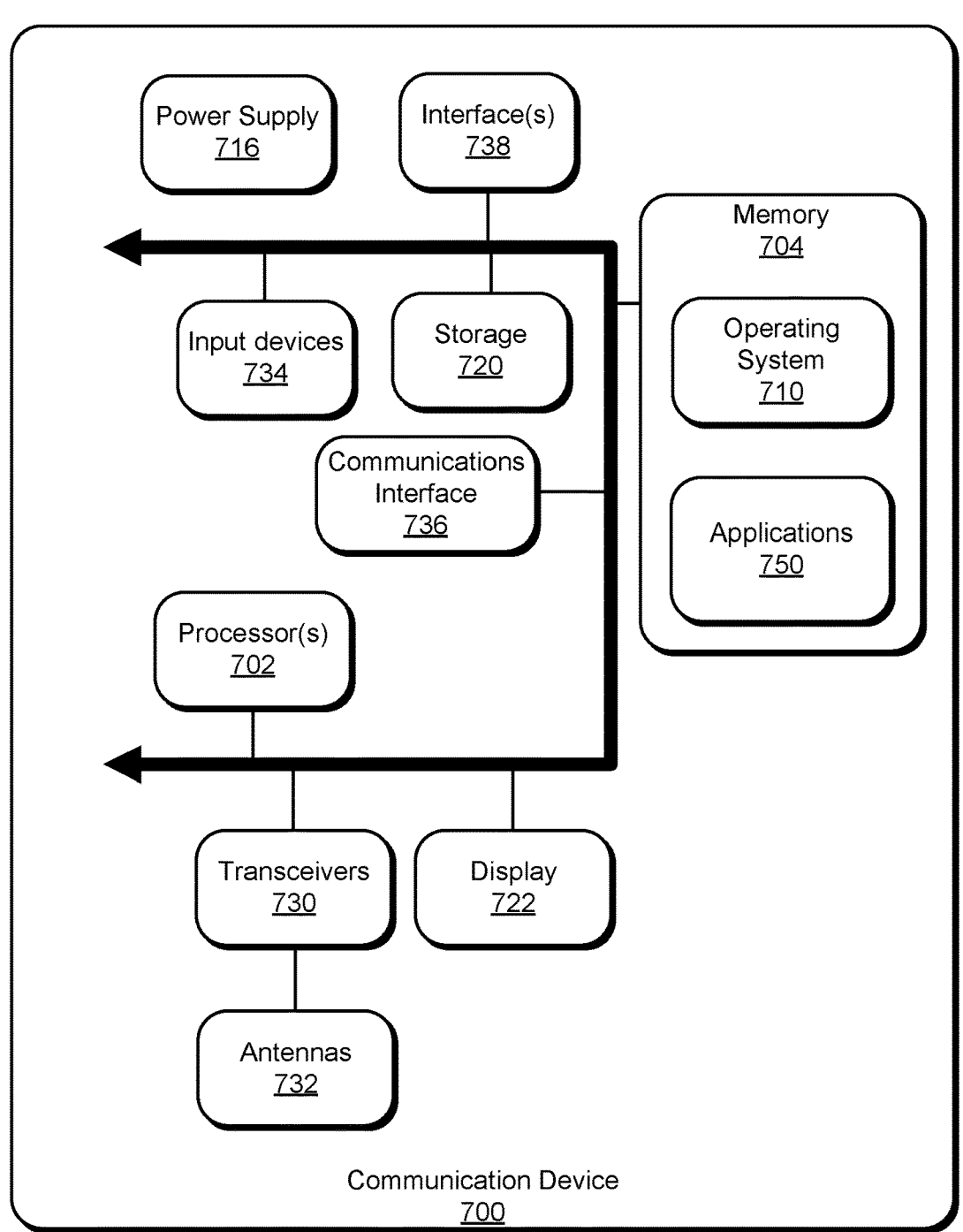
FIG. 7 illustrates an example communication device for implementing the features and operations of the described technology.

FIG. 7 illustrates an example communication device 700 for implementing the features and operations of the described technology. The communication device 700 is an example network-connected device and maybe a client device, such as a laptop, mobile device, desktop, tablet; a server/cloud device; an internet-of-things device; an electronic accessory; or another electronic device. The communication device 700 includes one or more processor(s) 702 and a memory 704. The memory 704 generally includes both volatile memory (e.g., RAM) and nonvolatile memory (e.g., flash memory). An operating system 710 resides in the memory 704 and is executed by the processor(s) 702.

In an example communication device 700, as shown in FIG. 7, one or more modules or segments, such as applications 750, an on-premise device provisioning service, a discovery endpoint, brokering services, and other services, workloads, and modules, are loaded into the operating system 710 on the memory 704 and/or storage 720 and executed by processor(s) 702. The storage 720 includes one or more tangible storage media devices and may store enrollment records, identities, provisioning records, public keys, certificates, cryptographic data elements, and other data and be local to the communication device 700 or may be remote and communicatively connected to the communication device 700.

The communication device 700 includes a power supply 716, which is powered by one or more batteries or other power sources and which provides power to other components of the communication device 700. The power supply 716 may also be connected to an external power source that overrides or recharges the built-in batteries or other power sources.

The communication device 700 may include one or more communication transceivers 730 which may be connected to one or more antenna(s) 732 to provide network connectivity (e.g., mobile phone network, Wi-Fi®, Bluetooth®) to one or more other servers and/or client devices (e.g., mobile devices, desktop computers, or laptop computers). The communication device 700 may further include a network adapter 736, which is a type of communication device. The communication device 700 may use the adapter and any other types of communication devices for establishing connections over a wide-area network (WAN) or local-area network (LAN). It should be appreciated that the network connections shown are exemplary and that other communication devices and means for establishing a communications link between the communication device 700 and other devices may be used.

The communication device 700 may include one or more input devices 734 such that a user may enter commands and information (e.g., a keyboard or mouse). These and other input devices may be coupled to the server by one or more interfaces 738, such as a serial port interface, parallel port, or universal serial bus (USB). The communication device 700 may further include a display 722, such as a touch screen display.

The communication device 700 may include a variety of tangible processor-readable storage media and intangible processor-readable communication signals. Tangible processor-readable storage can be embodied by any available media that can be accessed by the communication device 700 and includes both volatile and nonvolatile storage media, removable and non-removable storage media. Tangible processor-readable storage media excludes communications signals and includes volatile and nonvolatile, removable and non-removable storage media implemented in any method or technology for storage of information such as processor-readable instructions, data structures, program modules or other data. Tangible processor-readable storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other tangible medium which can be used to store the desired information and which can be accessed by the communication device 700. In contrast to tangible processor-readable storage media, intangible processor-readable communication signals may embody processor-readable instructions, data structures, program modules or other data resident in a modulated data signal, such as a carrier wave or other signal transport mechanism. The term "modulated data signal" means a signal that has one or more of its characteristics set or changed in such a manner as to encode information in the signal. By way of example, and not limitation, intangible communication signals include signals traveling through wired media such as a wired network or direct-wired connection, and wireless media such as acoustic, RF, infrared, and other wireless media.

While this specification contains many specific implementation details, these should not be construed as limitations on the scope of any inventions or of what may be claimed, but rather as descriptions of features specific to particular embodiments of a particular described technology. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

An example method of provisioning an on-premise device within an on-premise communications network includes connecting, via a network connection, an on-premise gateway system in the on-premise communications network with an off-premise device provisioning service system in an off-premise communications network, communicating one or more device provisioning records between the off-premise device provisioning service system and an on-premise device provisioning service of the on-premise gateway system via the network connection, disconnecting the network connection between the on-premise communications network and the off-premise communications network, responding to a discovery request received from the on-premise device via the on-premise communications network, while the network connection is disconnected, receiving, at the on-premise device provisioning service of the on-premise gateway system, a provisioning request from the on-premise device via the on-premise communications network, while the network connection is disconnected, responsive to the responding operation, and provisioning, by the on-premise device provisioning service of the on-premise gateway system, the on-premise device based on the one or more provisioning records, while the network connection is disconnected, responsive to receiving the provisioning request.

Another example method of any preceding method is provided, wherein the operations of responding to the discovery request, receiving the provisioning request, and provisioning the on-premise device occur before the communicating operation and the disconnecting operation.

Another example method of any preceding method is provided, wherein the operations of responding to the discovery request, receiving the provisioning request, and provisioning the on-premise device occur after the communicating operation and the disconnecting operation.

Another example method of any preceding method is provided, wherein the provisioning operation includes authenticating the on-premise device using the one or more device provisioning records via the on-premise communications network.

Another example method of any preceding method is provided, wherein the one or more provisioning records are sourced from a gateway identity brokering system of the on-premise gateway system, and the provisioning operation includes registering a cryptographic identity of the on-premise device to access one or more in-gateway solutions.

Another example method of any preceding method is provided, wherein the one or more provisioning records are sourced from an on-premise identity system communicatively coupled to the on-premise gateway system by the on-premise communications network, and the provisioning operation includes registering a cryptographic identity of the on-premise device to access one or more on-premise solutions external to the on-premise gateway system, wherein the one or more on-premise solutions are communicatively coupled to the on-premise gateway system by the on-premise communications network.

Another example method of any preceding method is provided, wherein the off-premise device provisioning service system registers a cryptographic identity of the on-premise device to access one or more off-premise solutions, after the communicating operation.

An example on-premise gateway system for provisioning an on-premise device within an on-premise communications network is provided. The offline device provisioning system includes one or more hardware processors, an off-premise network interface configured to communicate one or more provisioning records via a network connection with an off-premise device provisioning service system in the off-premise communications network, an on-premise network interface configured to communicate with an on-premise communications network, a discovery endpoint executed by the one or more hardware processors and configured to respond to a discovery request received from the on-premise device via the on-premise communications network, while the network connection is disconnected, and an on-premise device provisioning service executed by the one or more hardware processors. The off-premise network interface is configured to communicate one or more device provisioning records between the off-premise device provisioning service system and the on-premise device provisioning service via the network connection, while the network connection is connected. The on-premise device provisioning service is configured to receive a provisioning request from the on-premise device via the on-premise communications network, while the network connection is disconnected, and to provision the on-premise device based on the one or more provisioning records, while the network connection is disconnected.

Another example on-premise gateway system of any preceding system is provided, wherein the discovery endpoint is configured to respond to the discovery request, and the on-premise device provisioning service is configured to receive the provisioning request and provision the on-premise device, before the off-premise network interface communicates the one or more provisioning records with the off-premise device provisioning service system and before the network connection is disconnected.

Another example on-premise gateway system of any preceding system is provided, wherein the discovery endpoint is configured to respond to the discovery request, and the on-premise device provisioning service is configured to receive the provisioning request and provision the on-premise device, after the off-premise network interface communicates the one or more provisioning records with the off-premise device provisioning service system and after the network connection is disconnected.

Another example on-premise gateway system of any preceding system is provided, wherein the on-premise device provisioning service is configured to authenticate the on-premise device using the one or more device provisioning records via the on-premise communications network.

Another example on-premise gateway system of any preceding system is provided, wherein the one or more provisioning records are sourced from a gateway identity brokering system of the on-premise gateway system, and the on-premise device provisioning service is configured to register a cryptographic identity of the on-premise device to access one or more in-gateway solutions.

Another example on-premise gateway system of any preceding system is provided, wherein the one or more provisioning records are sourced from an on-premise identity system communicatively coupled to the on-premise gateway system by the on-premise communications network, and the on-premise device provisioning service is configured to register a cryptographic identity of the on-premise device to access one or more on-premise solutions external to the on-premise gateway system, wherein the one or more on-premise solutions are communicatively coupled to the on-premise gateway system by the on-premise communications network.

Another example on-premise gateway system of any preceding system is provided, wherein the off-premise device provisioning service system is further configured to register a cryptographic identity of the on-premise device to access one or more off-premise solutions after the one or more provisioning records are communicated to the off-premise device provisioning service system via the off-premise network interface.

One or more example tangible processor-readable storage media of a tangible article of manufacture encodes processor-executable instructions for executing on an electronic computing device a process of provisioning an on-premise device within an on-premise communications network. The process includes connecting, via a network connection, an on-premise gateway system in the on-premise communications network with an off-premise device provisioning service system in an off-premise communications network, communicating one or more device provisioning records between the off-premise device provisioning service system and an on-premise device provisioning service of the on-premise gateway system via the network connection, disconnecting the network connection between the on-premise communications network and the off-premise communications network, responding to a discovery request received from the on-premise device via the on-premise communications network, while the network connection is disconnected, receiving, at the on-premise device provisioning service of the on-premise gateway system, a provisioning request from the on-premise device via the on-premise communications network, while the network connection is disconnected, responsive to the responding operation, and provisioning, by the on-premise device provisioning service of the on-premise gateway system, the on-premise device based on the one or more provisioning records, while the network connection is disconnected, responsive to receiving the provisioning request.

Other one or more example tangible processor-readable storage media of any preceding storage media are provided, wherein the operations of responding to the discovery request, receiving the provisioning request, and provisioning the on-premise device occur before the communicating operation and the disconnecting operation.

Other one or more example tangible processor-readable storage media of any preceding storage media are provided, wherein the operations of responding to the discovery request, receiving the provisioning request, and provisioning the on-premise device occur after the communicating operation and the disconnecting operation.

Other one or more example tangible processor-readable storage media of any preceding storage media are provided, wherein the one or more provisioning records are sourced from a gateway identity brokering system of the on-premise gateway system, and the provisioning operation includes registering a cryptographic identity of the on-premise device to access one or more in-gateway solutions.

Other one or more example tangible processor-readable storage media of any preceding storage media are provided, wherein the one or more provisioning records are sourced from an on-premise identity system communicatively coupled to the on-premise gateway system by the on-premise communications network, and the provisioning operation includes registering a cryptographic identity of the on-premise device to access one or more on-premise solutions external to the on-premise gateway system, wherein the one or more on-premise solutions are communicatively coupled to the on-premise gateway system by the on-premise communications network.

Other one or more example tangible processor-readable storage media of any preceding storage media are provided, wherein the off-premise device provisioning service system registers a cryptographic identity of the on-premise device to access one or more off-premise solutions, after the communicating operation.

An example system of provisioning an on-premise device within an on-premise communications network includes means for connecting, via a network connection, an on-premise gateway system in the on-premise communications network with an off-premise device provisioning service system in an off-premise communications network, means for communicating one or more device provisioning records between the off-premise device provisioning service system and an on-premise device provisioning service of the on-premise gateway system via the network connection, means for disconnecting the network connection between the on-premise communications network and the off-premise communications network, means for responding to a discovery request received from the on-premise device via the on-premise communications network, while the network connection is disconnected, means for receiving, at the on-premise device provisioning service of the on-premise gateway system, a provisioning request from the on-premise device via the on-premise communications network, while the network connection is disconnected, responsive to the responding operation, and means for provisioning, by the on-premise device provisioning service of the on-premise gateway system, the on-premise device based on the one or more provisioning records, while the network connection is disconnected, responsive to receiving the provisioning request.

Another example system of any preceding system is provided, wherein the means for responding to the discovery request, means for receiving the provisioning request, and means for provisioning the on-premise device operate before the means for communicating and the means for disconnecting operate.

Another example system of any preceding system is provided, wherein the means for responding to the discovery request, means for receiving the provisioning request, and means for provisioning the on-premise device operate after the means for communicating and the means for disconnecting operate.

Another example system of any preceding system is provided, wherein the means for provisioning includes means for authenticating the on-premise device using the one or more device provisioning records via the on-premise communications network.

Another example system of any preceding system is provided, wherein the one or more provisioning records are sourced from a gateway identity brokering system of the on-premise gateway system, and the means for provisioning includes means for registering a cryptographic identity of the on-premise device to access one or more in-gateway solutions.

Another example system of any preceding system is provided, wherein the one or more provisioning records are sourced from an on-premise identity system communicatively coupled to the on-premise gateway system by the on-premise communications network, and the means for provisioning includes means for registering a cryptographic identity of the on-premise device to access one or more on-premise solutions external to the on-premise gateway system, wherein the one or more on-premise solutions are communicatively coupled to the on-premise gateway system by the on-premise communications network.

Another example system of any preceding system is provided, wherein the off-premise device provisioning service system registers a cryptographic identity of the on-premise device to access one or more off-premise solutions, after the means for communicating operates.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

A number of implementations of the described technology have been described. Nevertheless, it will be understood that various modifications can be made without departing from the spirit and scope of the recited claims.

What is claimed is:

1. A method of provisioning an on-premise device within an on-premise communications network, the method comprising:

connecting, via a network connection, an on-premise gateway system in the on-premise communications network with an off-premise device provisioning service system in an off-premise communications network, wherein the off-premise device provisioning service system is configured to register the on-premise device for use with off-premise solutions inaccessible by the on-premise device via the off-premise communications network while the network connection is disconnected;

communicating one or more device provisioning records between the off-premise device provisioning service system and an on-premise device provisioning service of the on-premise gateway system via the network connection;

disconnecting the network connection between the on-premise communications network and the off-premise communications network;

responding to a discovery request received from the on-premise device via the on-premise communications network, while the network connection is disconnected;

receiving, at the on-premise device provisioning service of the on-premise gateway system, a provisioning request from the on-premise device via the on-premise communications network, while the network connection is disconnected, responsive to the responding operation; and provisioning, by the on-premise device provisioning service of the on-premise gateway system, the on-premise device based on the one or more device provisioning records, while the network connection is disconnected, responsive to receiving the provisioning request, wherein the provisioning operation includes registering the on-premise device for use with on-premise solutions accessible to the on-premise device via the on-premise communications network while the network connection is disconnected.

2. The method of claim 1, wherein the operations of responding to the discovery request, receiving the provisioning request, and provisioning the on-premise device occur before the communicating operation and the disconnecting operation.

3. The method of claim 1, wherein the operations of responding to the discovery request, receiving the provisioning request, and provisioning the on-premise device occur after the communicating operation and the disconnecting operation.

4. The method of claim 1, wherein the provisioning operation comprises:

authenticating the on-premise device using the one or more device provisioning records via the on-premise communications network.

5. The method of claim 1, wherein the one or more provisioning records are sourced from a gateway identity brokering system of the on-premise gateway system, and the provisioning operation comprises:

registering a cryptographic identity of the on-premise device to access one or more in-gateway solutions.

6. The method of claim 1, wherein the one or more provisioning records are sourced from an on-premise identity system communicatively coupled to the on-premise gateway system by the on-premise communications network, and the provisioning operation comprises:

registering a cryptographic identity of the on-premise device to access one or more on-premise solutions external to the on-premise gateway system, wherein the one or more on-premise solutions are communicatively coupled to the on-premise gateway system by the on-premise communications network.

7. The method of claim 1, wherein the off-premise device provisioning service system registers a cryptographic identity of the on-premise device to access one or more off-premise solutions, after the communicating operation.

8. An on-premise gateway system for provisioning an on-premise device within an on-premise communications network, the on-premise gateway system comprising:

one or more hardware processors;

an off-premise network interface configured to communicate one or more provisioning records via a network connection with an off-premise device provisioning service system in an off-premise communications network, wherein the off-premise device provisioning service system is configured to register the on-premise device for use with off-premise solutions inaccessible by the on-premise device via the off-premise communications network while the network connection is disconnected;

an on-premise network interface configured to communicate with an on-premise communications network;

a discovery endpoint executed by the one or more hardware processors and configured to respond to a discovery request received from the on-premise device via the on-premise communications network, while the network connection is disconnected; and an on-premise device provisioning service executed by the one or more hardware processors, wherein the off-premise network interface is configured to communicate one or more device provisioning records between the off-premise device provisioning service system and the on-premise device provisioning service via the network connection, while the network connection is connected, and the on-premise device provisioning service is configured to receive a provisioning request from the on-premise device via the on-premise communications network, while the network connection is disconnected, and to provision the on-premise device based on the one or more provisioning records, while the network connection is disconnected, wherein the provisioning by the on-premise device provisioning service of the on-premise device includes registering the on-premise device for use with on-premise solutions accessible to the on-premise device via the on-premise communications network while the network connection is disconnected.

9. The on-premise gateway system of claim 8, wherein the discovery endpoint is configured to respond to the discovery request, and the on-premise device provisioning service is configured to receive the provisioning request and provision the on-premise device, before the off-premise network interface communicates the one or more provisioning records with the off-premise device provisioning service system and before the network connection is disconnected.

10. The on-premise gateway system of claim 8, wherein the discovery endpoint is configured to respond to the discovery request, and the on-premise device provisioning service is configured to receive the provisioning request and provision the on-premise device, after the off-premise network interface communicates the one or more provisioning records with the off-premise device provisioning service system and after the network connection is disconnected.

11. The on-premise gateway system of claim 8, wherein the on-premise device provisioning service is configured to authenticate the on-premise device using the one or more device provisioning records via the on-premise communications network.

12. The on-premise gateway system of claim 8, wherein the one or more provisioning records are sourced from a gateway identity brokering system of the on-premise gateway system, and the on-premise device provisioning service is configured to register a cryptographic identity of the on-premise device to access one or more in-gateway solutions.

13. The on-premise gateway system of claim 8, wherein the one or more provisioning records are sourced from an on-premise identity system communicatively coupled to the on-premise gateway system by the on-premise communications network, and the on-premise device provisioning service is configured to register a cryptographic identity of the on-premise device to access one or more on-premise solutions external to the on-premise gateway system, wherein the one or more on-premise solutions are communicatively coupled to the on-premise gateway system by the on-premise communications network.

14. The on-premise gateway system of claim 8, wherein the off-premise device provisioning service system is further configured to register a cryptographic identity of the on-premise device to access one or more off-premise solutions after the one or more provisioning records are communicated to the off-premise device provisioning service system via the off-premise network interface.

15. One or more tangible processor-readable storage media of a tangible article of manufacture encoding processor-executable instructions for executing on an electronic computing device a process of provisioning an on-premise device within an on-premise communications network, the process comprising:

connecting, via a network connection, an on-premise gateway system in the on-premise communications network with an off-premise device provisioning service system in an off-premise communications network, wherein the off-premise device provisioning service system is configured to register the on-premise device for use with off-premise solutions inaccessible by the on-premise device via the off-premise communications network while the network connection is disconnected;

communicating one or more device provisioning records between the off-premise device provisioning service system and an on-premise device provisioning service of the on-premise gateway system via the network connection;

disconnecting the network connection between the on-premise communications network and the off-premise communications network;

responding to a discovery request received from the on-premise device via the on-premise communications network, while the network connection is disconnected;

receiving, at the on-premise device provisioning service of the on-premise gateway system, a provisioning request from the on-premise device via the on-premise communications network, while the network connection is disconnected, responsive to the responding operation; and provisioning, by the on-premise device provisioning service of the on-premise gateway system, the on-premise device based on the one or more device provisioning records, while the network connection is disconnected, responsive to receiving the provisioning request, wherein the provisioning operation includes registering the on-premise device for use with on-premise solutions accessible to the on-premise device via the on-premise communications network while the network connection is disconnected.

16. The one or more tangible processor-readable storage media of claim 15, wherein the operations of responding to the discovery request, receiving the provisioning request, and provisioning the on-premise device occur before the communicating operation and the disconnecting operation.

17. The one or more tangible processor-readable storage media of claim 15, wherein the operations of responding to the discovery request, receiving the provisioning request, and provisioning the on-premise device occur after the communicating operation and the disconnecting operation.

18. The one or more tangible processor-readable storage media of claim 15, wherein the one or more device provisioning records are sourced from a gateway identity brokering system of the on-premise gateway system, and the provisioning operation comprises:

registering a cryptographic identity of the on-premise device to access one or more in-gateway solutions.

19. The one or more tangible processor-readable storage media of claim 15, wherein the one or more device provisioning records are sourced from an on-premise identity system communicatively coupled to the on-premise gateway system by the on-premise communications network, and the provisioning operation comprises:

registering a cryptographic identity of the on-premise device to access one or more on-premise solutions external to the on-premise gateway system, wherein the one or more on-premise solutions are communicatively coupled to the on-premise gateway system by the on-premise communications network.

20. The one or more tangible processor-readable storage media of claim 15, wherein the off-premise device provisioning service system registers a cryptographic identity of the on-premise device to access one or more off-premise solutions, after the communicating operation.

21. The method of claim 1, wherein the on-premise solutions include another on-premise device operable to work with the on-premise device over the on-premise communications network based on the provisioning.

22. The method of claim 1, further comprising:

provisioning, by the off-premise device provisioning service system, the on-premise device to access the off-premise solutions while the network connection is connected.

* * * * *